United States Patent
Sheen

(10) Patent No.: US 9,863,517 B2
(45) Date of Patent: Jan. 9, 2018

(54) NON-SYNCHRONOUS GEAR MESHING EVENTS FOR LIMITED SLIP DIFFERENTIALS

(71) Applicant: Eaton Corporation, Cleveland, OH (US)

(72) Inventor: Benjamin S. Sheen, Schoolcraft, MI (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 15/269,224

(22) Filed: Sep. 19, 2016

(65) Prior Publication Data

US 2017/0002909 A1  Jan. 5, 2017

Related U.S. Application Data

(63) Continuation of application No. PCT/US2014/071892, filed on Dec. 22, 2014.
(Continued)

(51) Int. Cl.
*F16H 48/08* (2006.01)
*F16H 48/36* (2012.01)
(Continued)

(52) U.S. Cl.
CPC ............ *F16H 48/08* (2013.01); *F16H 48/06* (2013.01); *F16H 48/36* (2013.01); *F16H 48/40* (2013.01);
(Continued)

(58) Field of Classification Search
None
See application file for complete search history.

(56) References Cited

U.S. PATENT DOCUMENTS

| 808,047 A | 12/1905 | Haldeman et al. |
| 1,399,045 A * | 12/1921 | Bernstein ............... A01B 71/06 172/292 |

(Continued)

FOREIGN PATENT DOCUMENTS

| DE | 3331535 A1 | 2/1984 |
| DE | 10309602 A1 | 9/2004 |

OTHER PUBLICATIONS

International Search Report and Written Opinion for International Application No. PCT/US2014/071892 dated Jan. 8, 2016, 16 pages.

*Primary Examiner* — Justin Holmes
(74) *Attorney, Agent, or Firm* — RMCK Law Group PLC

(57) ABSTRACT

A differential gear mechanism includes a differential case, a first side gear, a second side gear, a first pinion and a second pinion. The first side gear is rotatably mounted within the differential case and has a first outer diameter. The second side gear is rotatably mounted within the differential case and has a second diameter. The first pinion gear is meshed for rotation with the first side gear during a first meshing event. The second pinion gear is meshed for rotation with the second side gear during a second meshing event. The first and second pinion gears form a torque transfer arrangement configured for transferring torque between the first and second pinion gears and the first and second side gears to rotate the first and second side gears. The first and second outer diameters are distinct such that the first and second meshing events are offset in time.

20 Claims, 2 Drawing Sheets

Related U.S. Application Data

(60) Provisional application No. 61/955,295, filed on Mar. 19, 2014.

(51) Int. Cl.
*F16H 48/06* (2006.01)
*F16H 48/40* (2012.01)

(52) U.S. Cl.
CPC .. *F16H 2048/082* (2013.01); *F16H 2048/087* (2013.01)

(56) References Cited

U.S. PATENT DOCUMENTS

| | | | | |
|---|---|---|---|---|
| 1,687,075 A | * | 10/1928 | Wiedmaier | F16H 3/64 475/205 |
| 2,962,916 A | * | 12/1960 | Koelsch | B60K 17/3467 180/247 |
| 3,548,683 A | * | 12/1970 | Fisher | F16H 48/147 475/164 |
| 5,088,970 A | * | 2/1992 | Dye | F16H 48/29 475/226 |

\* cited by examiner

NON-SYNCHRONOUS GEAR MESHING EVENTS FOR LIMITED SLIP DIFFERENTIALS

CROSS-REFERENCE TO RELATED APPLICATIONS

This application is a continuation of International Application No. PCT/US2014/071892 filed on Dec. 22, 2014, which claims the benefit of U.S. Patent Application No. 61/955,295 filed on Mar. 19, 2013. The disclosure of the above application is incorporated herein by reference.

FIELD

The present disclosure relates generally to differential gear assemblies and more particularly to a differential gear arrangement having side gears that have staggered meshing events.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions. In some arrangements, hydraulic fluid is delivered to actuate the piston.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential case, a first side gear, a second side gear a first pinion and a second pinion. The differential case can define first and second output shaft openings that are coaxially aligned along an axis of rotation of the differential case. The first side gear can be rotatably mounted within the differential case and have a first outer diameter. The second side gear can be rotatably mounted within the differential case and have a second diameter. The first pinion gear can be meshed for rotation with the first side gear during a first meshing event. The second pinion gear can be meshed for rotation with the second side gear during a second meshing event. The first and second pinion gears form a torque transfer arrangement configured for transferring torque between the first and second pinion gears and the first and second side gears to rotate the first and second side gears about the axis of rotation. The first and second outer diameters are distinct such that the first and second meshing events are offset in time.

According to additional features, the first and second meshing events can occur at distinct angular positions. The first and second meshing events can be out of phase. The first side gear and the first pinion can collectively provide a first contact ratio. The second side gear and the second pinion can collectively provide a second contact ratio. The first and second contact ratios can be distinct. The first side gear and the first pinion can collectively provide a first length of contact. The second side gear and the second pinion can collectively provide a second length of contact. The first and second lengths of contact can be distinct.

According to other features, the first pinion gear can include a first series of pinion gear teeth each having a first pinion gear tip. A series of first contacts between the respective first pinion gear tips and corresponding teeth of the first side gear occurs at a first sequence of contacting times. The second pinion gear can include a second series of pinion gear teeth each having a second pinion gear tip. A series of second contacts between the respective second pinion gear tips and corresponding teeth of the second gear can occur at a second sequence of contacting times. Each time of the first sequence of contacting times is offset from each time of the second sequence of contacting times. The first side gear and the first pinion can collectively provide a first line of action. The second side gear and the second pinion collectively provide a second line of action. The first and second lines of actions can be distinct.

A differential gear mechanism constructed in accordance to another example of the present disclosure can include a differential case, a first side gear, a second side gear a first pinion and a second pinion. The differential case can define first and second output shaft openings that are coaxially aligned along an axis of rotation of the differential case. The first side gear can be rotatably mounted within the differential case and have a first outer diameter. The second side gear can be rotatably mounted within the differential case and have a second diameter. The first pinion gear can be meshed for rotation with the first side gear during a first meshing event. The second pinion gear can be meshed for rotation with the second side gear during a second meshing event. The first and second pinion gears form a torque transfer arrangement configured for transferring torque between the first and second pinion gears and the first and second side gears to rotate the first and second side gears about the axis of rotation. The first side gear and the first pinion can collectively provide a first contact ratio. The second side gear and the second pinion can collectively provide a second contact ratio. The first and second contact ratios can be distinct.

According to other features, the first and second meshing events can be out of phase. The first side gear and the first pinion can collectively provide a first length of contact. The second side gear and the second pinion can collectively provide a second length of contact. The first and second lengths of contact can be distinct. The first and second outer diameters are distinct such that the first and second meshing events are offset in time. The first side gear and the first pinion can collectively provide a first line of action. The second side gear and the second pinion can collectively provide a second line of action. The first and second lines of action can be distinct.

A differential gear mechanism constructed in accordance to other examples of the present disclosure can include a differential case, a first side gear, a second side gear a first pinion and a second pinion. The differential case can define first and second output shaft openings that are coaxially aligned along an axis of rotation of the differential case. The first side gear can be rotatably mounted within the differential case and have a first outer diameter. The second side gear can be rotatably mounted within the differential case and have a second diameter. The first pinion gear can be meshed for rotation with the first side gear during a first meshing event. The second pinion gear can be meshed for rotation with the second side gear during a second meshing event. The first and second pinion gears form a torque transfer arrangement configured for transferring torque between the first and second pinion gears and the first and second side gears to rotate the first and second side gears about the axis of rotation. The first pinion gear includes a first series of pinion gear teeth each having a first pinion gear tip. A series of first contacts between the respective first pinion gear tips and corresponding teeth of the first side gear occurs at a first sequence of contacting times. The second pinion gear includes a second series of pinion gear teeth each having a second pinion gear tip. A series of second contacts between the respective second pinion gear tips and corresponding teeth of the second side gear occurs at a second sequence of contacting times. Each time of the first sequence of contacting times can be offset from each time of the second sequence of contacting times.

BRIEF DESCRIPTION OF THE DRAWINGS

The present disclosure will become more fully understood from the detailed description and the accompanying drawings, wherein.

DETAILED DESCRIPTION

Figure 1:
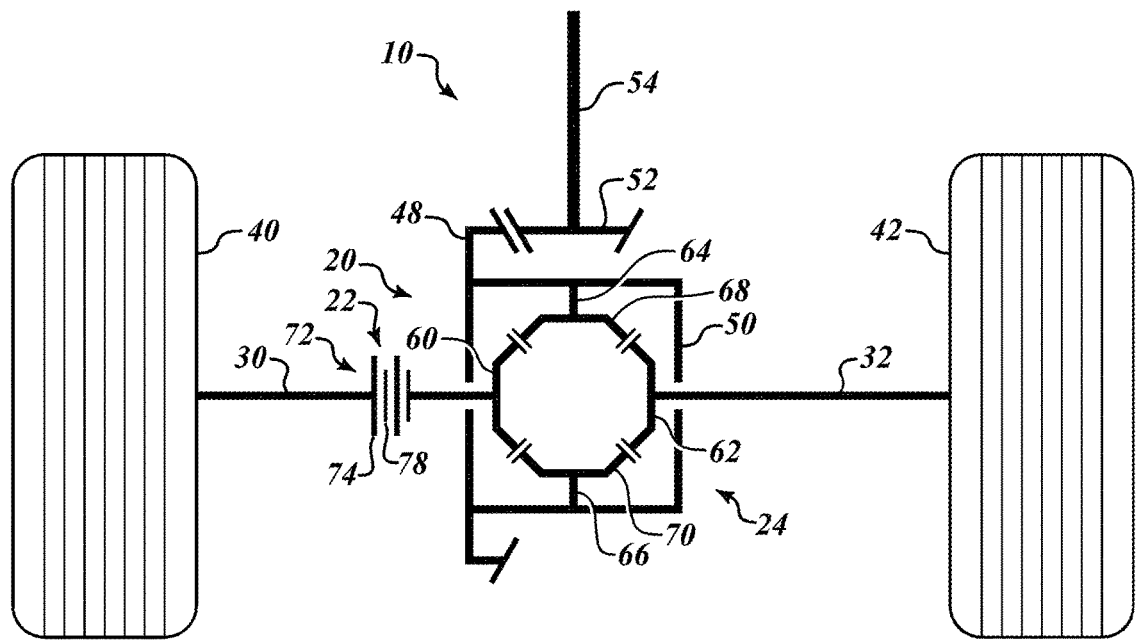
FIG. 1 is a schematic view of an exemplary vehicle driveline incorporating a differential gear assembly constructed in accordance to one example of the present disclosure.

With initial reference to FIG. 1, an exemplary vehicle driveline is shown and generally identified with reference numeral 10. The exemplary vehicle driveline 10 described herein is for a rear wheel drive vehicle having a limited slip differential, however, it will be appreciated that the teachings of the present disclosure may be used in other differential gear mechanisms or gear mechanisms in general.

The driveline 10 can generally include a limited slip differential assembly 20 having a clutch assembly 22 and a differential gear assembly or mechanism 24. The limited slip differential assembly 20 operates to drive a pair of axle shafts 30 and 32 that are connected to drive wheels 40 and 42, respectively. In general, the limited slip differential assembly 20 functions as a traditional open differential during normal operating conditions until an event occurs where a bias torque is required. When a loss in traction is detected or anticipated, the clutch assembly 22 can be selectively actuated in order to generate the optimum bias ratio for the situation.

A ring gear 48 can be fixed to a differential case 50 of the differential gear assembly 20. The ring gear 48 can be meshed for rotation with a drive pinion 52 of an input pinion shaft 54. In general, the input pinion shaft 54 can be driven by an engine (not shown) through a transmission (not shown). The input pinion shaft 54 can transmit rotatable motion from the drive pinion 52 through the ring gear 48 to drive the differential case 50.

The ring gear 48 is non-rotatably fixed to the differential case 50. The differential gear assembly 24 includes a first and second side gear 60 and 62 that are mounted for rotation with the axle shafts 30 and 32 (and first and second drive wheels 40 and 42), respectively. A first and second pinion gear shaft 64 and 66 are fixedly mounted to the differential case 50 for rotation therewith. A corresponding first and second pinion gear 68 and 70 are mounted for rotation with the pinion gear shafts 64, 66 and are in meshing relationship with both of the side gears 60 and 62. While two pinion gears are shown in the drawings, it will be appreciated that more than two pinion gears may be included in the differential gear assembly 24. In an open configuration, described more fully below, the differential gear assembly 24 acts to allow the axle shafts 30 and 32 to rotate at different speeds.

The clutch assembly 22 can generally include a clutch pack 72 and a clutch actuator (not shown). The clutch pack 72 includes a plurality of annular plates 74 interleaved between a plurality of annular friction disks 78. The plurality of annular plates 74 can be coupled for rotation with one of the differential case 50 and the differential gear assembly 24. The plurality of annular friction disks 78 can be coupled for rotation with the other one of the differential case 50 and the differential gear assembly 24.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 22 is in the open condition. The annular plates 74 and annular friction disks 78 are axially movable into frictional engagement relative to one another, thereby reducing relative rotation between the annular plates 74 and annular friction disks 78 when the clutch assembly 22 is in the closed or partially closed configurations. In this manner, when the clutch assembly 22 is in its closed position, the side gears 60 and 62, as well as the axle shafts 30 and 32 and the drive wheels 40 and 42 rotate together.

The clutch assembly 22 can operate in an open configuration to allow the side gears 60 and 62 to rotate independently from each other, e.g., at different speeds. The clutch assembly 22 can also operate in a closed or partially closed configuration where the side gears 60 and 62 rotate together or partially together (that is, not independently), e.g., at substantially the same speed. The clutch assembly 22 can, for example, be a hydraulic clutch assembly that utilizes pressurized hydraulic fluid that can act on a piston (not shown) of the clutch actuator to selectively actuate the clutch pack 72 between the open, closed and partially closed configurations. Other configurations are contemplated.

Figure 2:
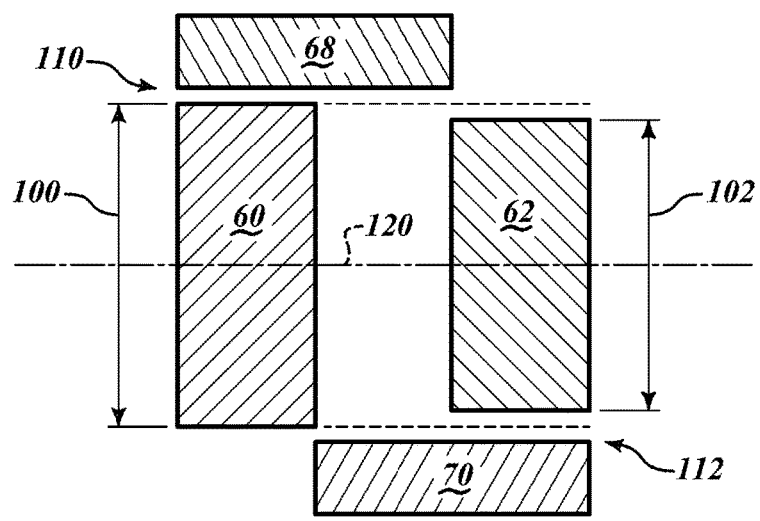
FIG. 2 is a sectional view taken through first and second side gears and first and second pinion gears of the differential assembly of FIG. 1.

With additional reference now to FIGS. 2-4, additional features of the differential gear assembly 24 will be described. The first side gear 60 is rotatably mounted within the differential case 50 and has a first outer diameter 100. The second side gear 62 is rotatably mounted within the differential case 50 and has a second outer diameter 102. The first outer diameter 100 is distinct from the second outer diameter 102. In the example shown, the second outer diameter 102 is less than the first outer diameter 100.

The first pinion gear 68 is meshed for rotation with the first side gear 60 at a first gear mesh 110 (FIGS. 2 and 3) during a first meshing event. The second pinion gear 70 is meshed for rotation with the second side gear 62 at a second gear mesh 112 (FIGS. 2 and 4) during a second meshing event. The first and second pinion gears 68, 70 form a torque transfer arrangement configured for transferring torque between the first and second pinion gears 68, 70 and the first and second side gears 60, 62 to rotate the first and second side gears 60, 62 about an axis of rotation 120. Because the first and second outer diameters 100 and 102 are distinct, the first and second gear mesh 110 and 112 are distinct. In this regard, the meshing events are offset in time.

Figure 3:
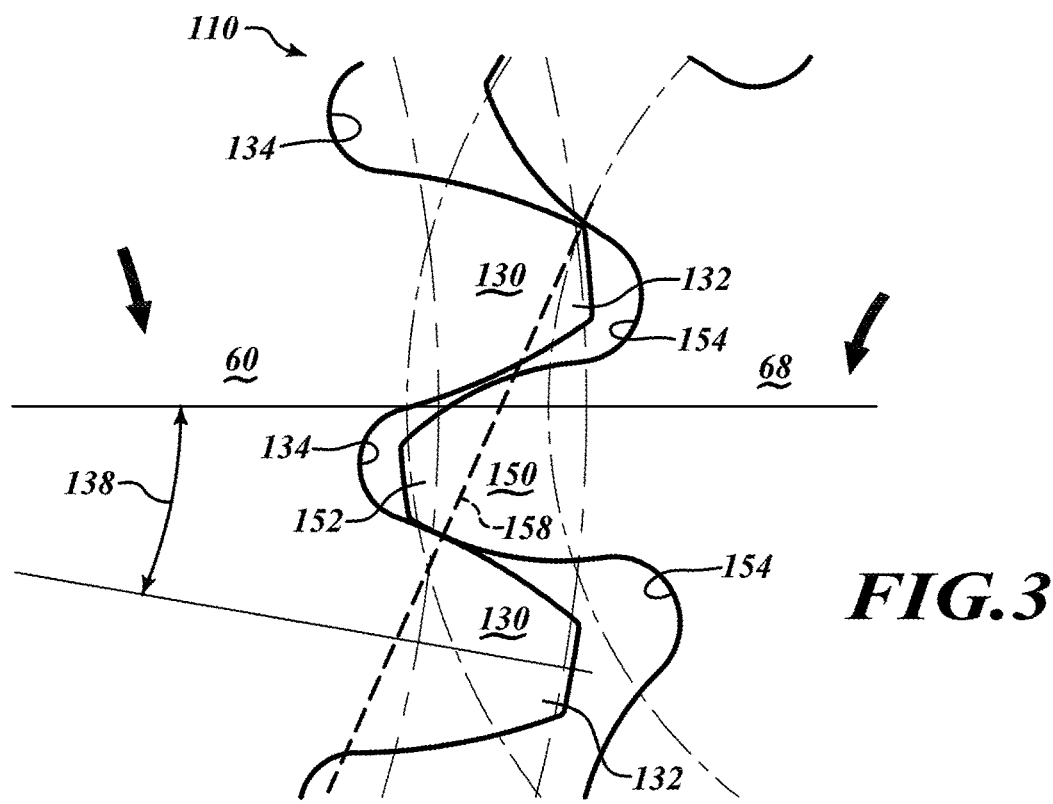
FIG. 3 is an exemplary gear meshing event between the first side gear and the first pinion gear of FIG. 2.

Turning now to FIG. 3, the first side gear 60 and the first pinion 68 are shown at the first gear mesh 110 during a first meshing event. The first side gear 60 includes first side gear teeth 130 each having a teeth tip 132. Corresponding roots 134 are provided between adjacent first side gear teeth 130. The first side gear 60 defines a roll angle 138. The first pinion 68 includes first pinion gear teeth 150 each having a teeth tip 152. Corresponding roots 154 are provided between adjacent first pinion gear teeth 150. A line of action 158 is defined between the first side gear 60 and the first pinion gear 68.

Figure 4:
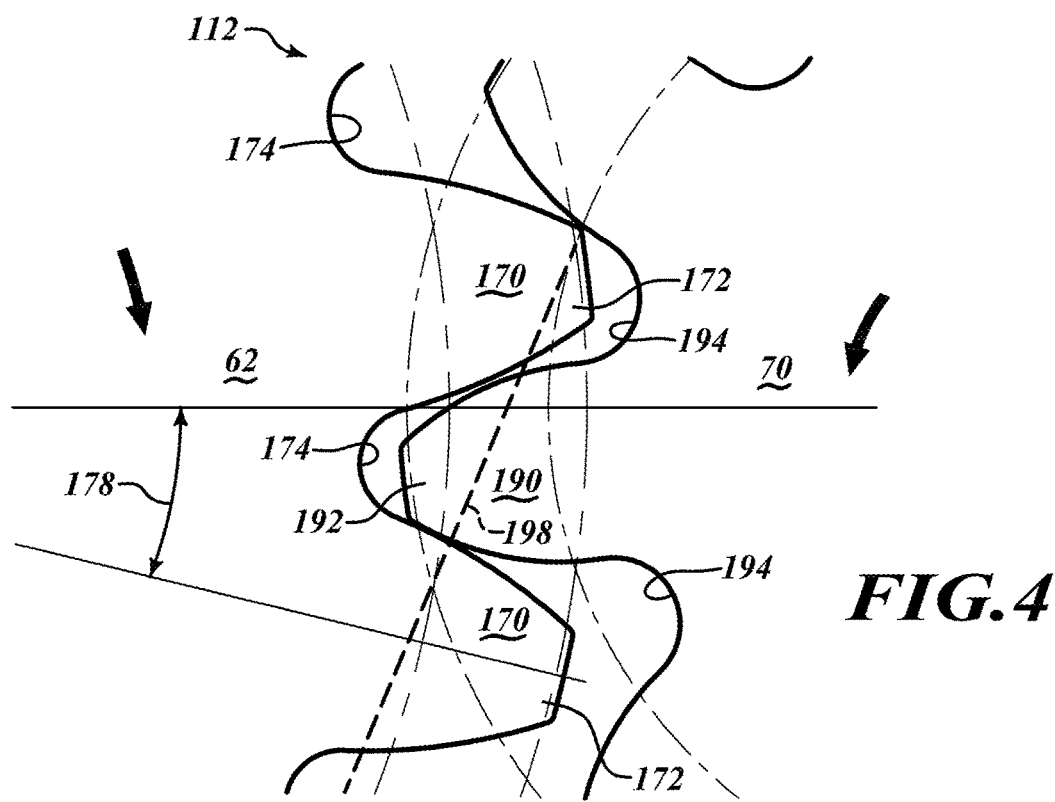
FIG. 4 is an exemplary gear meshing event between the second side gear and the second pinion gear of FIG. 2.

Turning now to FIG. 4, the second side gear 62 and the second pinion 70 are shown at the second gear mesh 112 during a second meshing event. The second side gear 62 includes second side gear teeth 170 each having a tooth tip 172. Corresponding roots 174 are provided between adjacent second side gear teeth 170. The second side gear 62 defines a roll angle 178. The second pinion 70 includes second pinion gear teeth 190 each having a tooth tip 192. Corresponding roots 194 are provided between adjacent first pinion gear teeth 190. A line of action 198 is defined between the second side gear 62 and the second pinion gear 70.

When differential assemblies incorporate side gears having the same gear geometry, meshing events with corresponding pinion gears are concurrent. That is, the tip of one gear contacts with the root of its mate at a given position. All pinion gears will share this rotational contact point. The position is specified in degrees of roll, which is an angular rotation of the gear. The differential assembly 24 of the present disclosure provides many advantages over differential assemblies having side gears with the same gear geometries. Because the side gears 60 and 62 have different diameters, the meshing events of the side gears 60 and 62 with the pinion gears 68 and 70 are staggered. Again, it will be appreciated that while the drawings identify two pinion gears, more than two may be incorporated into the differential assembly 24. The timing of the gear meshing events is therefore offset. The contact ratio, the length of contact and the tip-to-root contact event will be different for both side gears 60 and 62. By providing side gears 60 and 62 that have different diameters, the meshing events will occur at different angular positions creating slight out-of-phase meshing event frequency for each side gear 60 and 62. In this regard, the first and second meshing events are not in phase. In one example the first and second meshing events are offset between 2-4 degrees. The differential assembly 24 can operate at reduced noise levels and encounter reduced stress amplitudes during operation.

Returning now to FIG. 3, the first pinion gear 68 includes the first series of pinion gear teeth 150 each having the first pinion gear tip 152. A first series of contacts between the respective first pinion gear tips 152 and corresponding teeth 130 of the first side gear 60 occurs at a first sequence of times. Similarly, referring to FIG. 4, the second pinion gear 70 includes the second series of pinion gear teeth 190 each having the second pinion gear tip 192. A second series of contacts between the respective second pinion gear tips 192 and corresponding teeth 190 of the second side gear 62 occurs at a second sequence of times. Each time of the first sequence of contacting times is offset from each time of the second sequence of contacting times. The line of action 158 is distinct from the line of action 198. The roll angle 138 is distinct from the roll angle 178.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential assembly comprising:
    a differential case defining first and second output shaft openings that are coaxially aligned along an axis of rotation of the differential case;
    a first side gear rotatably mounted within the differential case and having a first outer diameter;
    a second side gear rotatably mounted within the differential case and having a second outer diameter;
    a first pinion gear rotatably coupled to a first pinion gear shaft fixed to the differential case, the first pinion gear meshed for rotation with the first side gear during a first meshing event, the first pinion gear being the only gear coupled to the first pinion gear shaft, and the first pinion gear meshing with the first side gear and not the second side gear; and
    a second pinion gear rotatably coupled to a second pinion gear shaft fixed to the differential case, the second pinion gear meshed for rotation with the second side gear during a second meshing event, the second pinion gear being the only gear coupled to the second pinion gear shaft, and the second pinion gear meshing with the second side gear and not the first side gear;
    wherein the first and second pinion gears form a torque transfer arrangement configured for transferring torque between the first and second pinion gears and the first and second side gears to rotate the first and second side gears about the axis of rotation;

wherein the first and second outer diameters are distinct such that the first and second meshing events are offset in time.

2. The differential assembly of claim 1 wherein the first and second meshing events occur at distinct angular positions.

3. The differential assembly of claim 1 wherein the first and second meshing events are not in phase.

4. The differential assembly of claim 3 wherein the first meshing event and the second meshing event are offset between 2-4 degrees.

5. The differential assembly of claim 1 wherein the first side gear and the first pinion collectively provide a first contact ratio and wherein the second side gear and the second pinion collectively provide a second contact ratio, wherein the first and second contact ratios are distinct.

6. The differential assembly of claim 1 wherein the first side gear and the first pinion collectively provide a first length of contact and wherein the second side gear and the second pinion collectively provide a second length of contact, wherein the first and second lengths of contact are distinct.

7. The differential assembly of claim 1 wherein the first pinion gear includes a first series of pinion gear teeth each having a first pinion gear tip wherein a series of first contacts between the respective first pinion gear tips and corresponding teeth of the first side gear occurs at a first sequence of contacting times.

8. The differential assembly of claim 7 wherein the second pinion gear includes a second series of pinion gear teeth each having a second pinion gear tip wherein a series of second contacts between the respective second pinion gear tips and corresponding teeth of the second side gear occurs at a second sequence of contacting times, wherein each time of the first sequence of contacting times is offset from each time of the second sequence of contacting times.

9. The differential assembly of claim 1 wherein the first side gear and the first pinion collectively provide a first line of action and wherein the second side gear and the second pinion collectively provide a second line of action, wherein the first and second lines of action are distinct.

10. A differential assembly comprising:
a differential case defining first and second output shaft openings that are coaxially aligned along an axis of rotation of the differential case;
a first side gear rotatably mounted within the differential case and having a first outer diameter;
a second side gear rotatably mounted within the differential case and having a second outer diameter;
a first pinion gear rotatably coupled to a first pinion gear shaft fixed to the differential case, the first pinion gear meshed for rotation with the first side gear during a first meshing event, the first pinion gear being the only gear coupled to the first pinion pear shaft, and the first pinion gear meshing with the first side gear and not the second side gear; and
a second pinion gear rotatably coupled to a second pinion gear shaft fixed to the differential case, the second pinion gear meshed for rotation with the second side gear during a second meshing event, the second pinion gear being the only gear coupled to the second pinion gear shaft, and the second pinion gear meshing with the second side pear and not the first side gear;
wherein the first and second pinion gears form a torque transfer arrangement configured for transferring torque between the first and second pinion gears and the first and second side gears to rotate the first and second side gears about the axis of rotation;
wherein the first side gear and the first pinion collectively provide a first contact ratio and wherein the second side gear and the second pinion collectively provide a second contact ratio, wherein the first and second contact ratios are distinct.

11. The differential assembly of claim 10 wherein the first and second meshing events are not in phase.

12. The differential assembly of claim 11 wherein the first meshing event and the second meshing event are offset between 2-4 degrees.

13. The differential assembly of claim 10 wherein the first side gear and the first pinion collectively provide a first length of contact and wherein the second side gear and the second pinion collectively provide a second length of contact, wherein the first and second lengths of contact are distinct.

14. The differential assembly of claim 10 wherein the first and second outer diameters are distinct such that the first and second meshing events are offset in time.

15. The differential assembly of claim 10 wherein the first side gear and the first pinion collectively provide a first line of action and wherein the second side gear and the second pinion collectively provide a second line of action, wherein the first and second lines of action are distinct.

16. A differential assembly comprising:
a differential case defining first and second output shaft openings that are coaxially aligned along an axis of rotation of the differential case;
a first side gear rotatably mounted within the differential case and having a first outer diameter;
a second side gear rotatably mounted within the differential case and having a second outer diameter;
a set of three first pinion gears meshed for rotation with the first side gear during a first meshing event; and
a set of three second pinion gears meshed for rotation with the second side gear during a second meshing event, wherein the first and second sets of pinion gears form a torque transfer arrangement configured for transferring torque between the first and second sets of pinion gears and the first and second side gears to rotate the first and second side gears about the axis of rotation;
wherein (i) the set of first pinion gears includes a first series of pinion gear teeth each having a first pinion gear tip wherein a series of first contacts between the respective first pinion gear tips and corresponding teeth of the first side gear occurs at a first sequence of contacting times, and (ii) the set of second pinion gears includes a second series of pinion gear teeth each having a second pinion gear tip wherein a series of second contacts between the respective second pinion gear tips and corresponding teeth of the second side gear occurs at a second sequence of contacting times, wherein each time of the first sequence of contacting times is offset from each time of the second sequence of contacting times.

17. The differential assembly of claim 16 wherein the first and second meshing events occur at distinct angular positions.

18. The differential assembly of claim 16 wherein the first side gear and the set of first pinion pears collectively provide a first contact ratio and wherein the second side gear and the set of second pinion pears collectively provide a second contact ratio, wherein the first and second contact ratios are distinct.

19. The differential assembly of claim 16 wherein the first and second meshing events are out of phase.

20. The differential assembly of claim 16 wherein the first side gear and the set of first pinion pears collectively provide a first length of action and wherein the second side gear and the set of second pinion pears collectively provide a second length of action, wherein the first and second lengths of action are distinct.

* * * * *